(12) United States Patent
Pidduck et al.

(10) Patent No.: US 10,747,815 B2
(45) Date of Patent: Aug. 18, 2020

(54) SYSTEM AND METHOD FOR SEARCHING CHAINS OF REGIONS AND ASSOCIATED SEARCH OPERATORS

(71) Applicant: Open Text SA ULC, Halifax (CA)

(72) Inventors: Patrick Thomas Sidney Pidduck, Waterloo (CA); Laura Dianne Ramsahai, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 195 days.

(21) Appl. No.: 15/976,603

(22) Filed: May 10, 2018

(65) Prior Publication Data

US 2018/0330009 A1 Nov. 15, 2018

Related U.S. Application Data

(60) Provisional application No. 62/504,606, filed on May 11, 2017.

(51) Int. Cl.
*G06F 16/901* (2019.01)
*G06F 16/182* (2019.01)
*G06F 16/9038* (2019.01)
*G06F 16/903* (2019.01)

(52) U.S. Cl.
CPC ........ *G06F 16/9027* (2019.01); *G06F 16/182* (2019.01); *G06F 16/9038* (2019.01); *G06F 16/90344* (2019.01)

(58) Field of Classification Search
CPC .............. G06F 16/927; G06F 16/9038; G06F 16/90344
USPC ........................................................ 707/706
See application file for complete search history.

(56) References Cited

U.S. PATENT DOCUMENTS

| | | |
|---|---|---|
| 6,105,023 A | 8/2000 | Callan |
| 6,988,093 B2 | 1/2006 | Pic et al. |
| 7,200,271 B2 | 4/2007 | Boose et al. |
| 7,657,515 B1 * | 2/2010 | Jewell ................. G06F 16/3332 707/999.003 |
| 8,219,579 B2 | 7/2012 | Rattner |
| 8,326,861 B1 | 12/2012 | Ainslie |
| 8,572,126 B2 | 10/2013 | Flor et al. |
| 8,661,023 B1 | 2/2014 | Chun et al. |
| 9,165,068 B2 | 10/2015 | Winter et al. |
| 9,208,254 B2 * | 12/2015 | Zhang ..................... G06F 16/81 |
| 9,348,890 B2 | 5/2016 | Larson |
| 9,824,142 B2 | 11/2017 | Kusumura |
| 9,836,529 B2 | 12/2017 | Zelevinsky et al. |

(Continued)

OTHER PUBLICATIONS

International Search Report and Written Opinion for International Patent Application No. PCT/CA2018/050818, dated Oct. 9, 2018, 11 pgs.

(Continued)

*Primary Examiner* — Usmaan Saeed
*Assistant Examiner* — Jessica N Le
(74) *Attorney, Agent, or Firm* — Sprinkle IP Law Group

(57) ABSTRACT

Embodiments as disclosed herein allow simple specification of prioritized searches of chains of regions and efficient implementation of such searches. Specifically, embodiments as disclosed may provide a search operator that addresses the problem of complex query construction for finding objects having a particular value in one of a prioritized set of regions and efficiently implement the searches specified by such search operators.

21 Claims, 6 Drawing Sheets

(56) References Cited

U.S. PATENT DOCUMENTS

| | | | |
|---|---|---|---|
| 10,073,875 B2* | 9/2018 | Larson | G06F 16/24575 |
| 1,069,170 A1 | 6/2020 | Pidduck et al. | |
| 2004/0064447 A1 | 4/2004 | Simske et al. | |
| 2005/0114317 A1 | 5/2005 | Bhide | |
| 2007/0011321 A1* | 1/2007 | Huntington | H04L 43/028 |
| | | | 709/224 |
| 2007/0106658 A1* | 5/2007 | Ferrari | G06F 16/904 |
| 2008/0189261 A1 | 8/2008 | Andreev | |
| 2009/0006447 A1* | 1/2009 | Balmin | G06F 16/8373 |
| 2013/0226935 A1 | 8/2013 | Bai et al. | |
| 2014/0163955 A1* | 6/2014 | Ng Tari | G06F 40/205 |
| | | | 704/9 |
| 2015/0178286 A1 | 6/2015 | Dhollander | |
| 2015/0310115 A1 | 10/2015 | Ryger | |
| 2017/0011046 A1 | 1/2017 | Kapoor et al. | |
| 2017/0011114 A1 | 1/2017 | Naressi | |
| 2017/0124162 A1 | 5/2017 | Pidduck et al. | |
| 2017/0371924 A1 | 12/2017 | Ding et al. | |
| 2019/0272343 A1 | 9/2019 | Pidduck et al. | |

OTHER PUBLICATIONS

Office Action for U.S. Appl. No. 15/331,327, dated Apr. 15, 2019, 14 pgs.
International Search Report and Written Opinion issued for International PCT Application No. PCT/IB2019/051253, dated Jun. 11, 2019, 7 pages.
Office Action for U.S. Appl. No. 15/331,327, dated Dec. 31, 2019, 16 pgs.
Office Action for U.S. Appl. No. 15/911,412, dated Mar. 24, 2020, 14 pgs.
Notice of Allowance for U.S. Appl. No. 15/331,327, dated Apr. 3, 2020, 3 pgs.

* cited by examiner

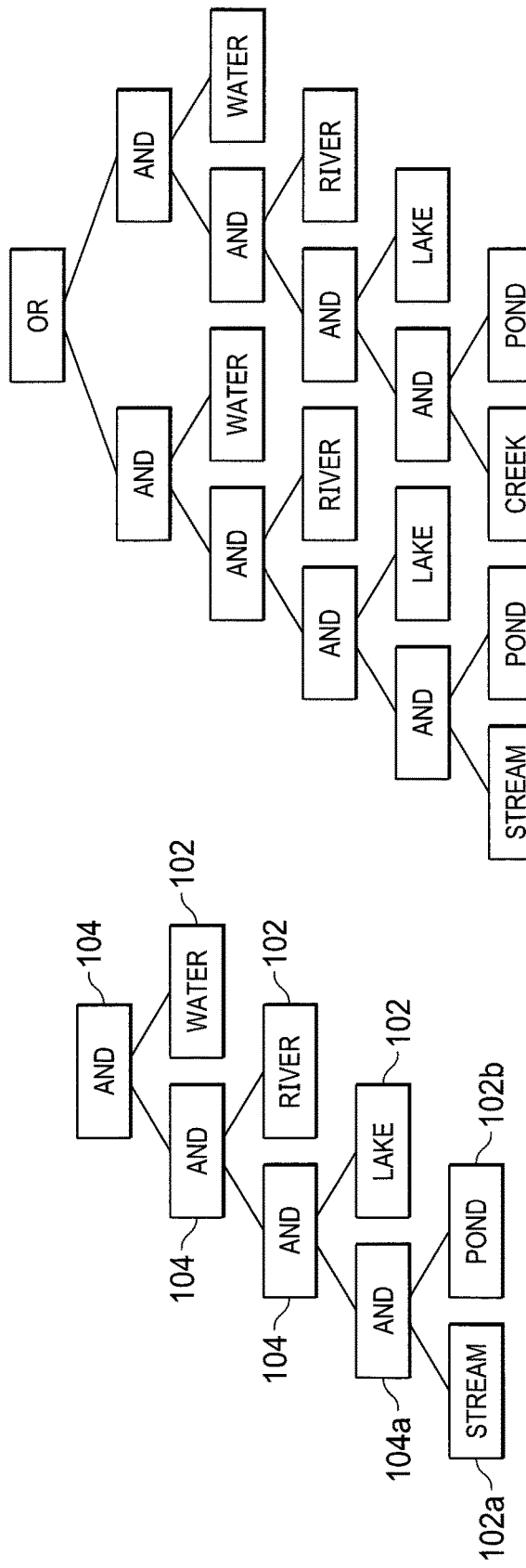
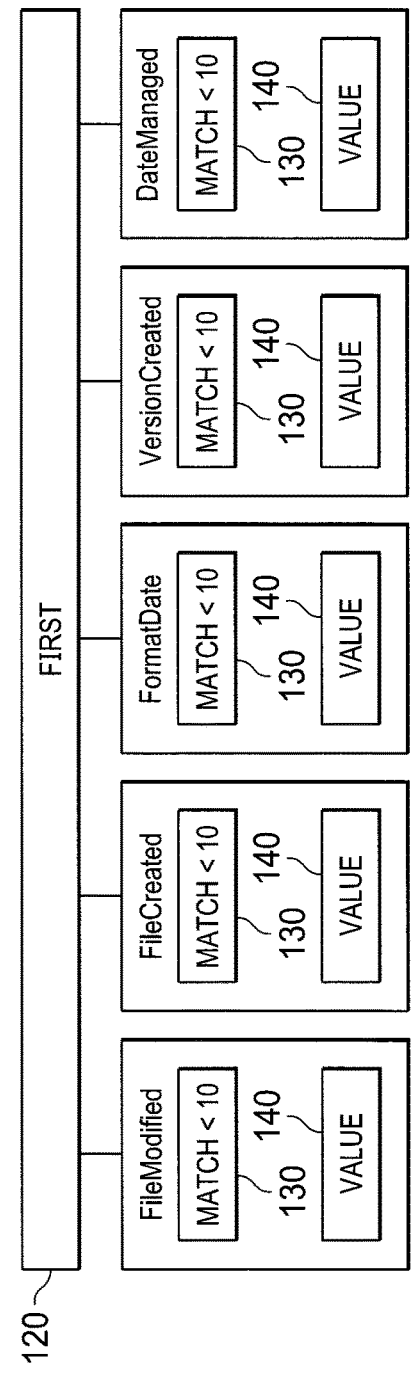
FIG. 1A
FIG. 1B
FIG. 1C

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

| OBJECT ID | Field1 | Field2 | Field3 | Field4 |
|---|---|---|---|---|
| 1 | DOG | DOG | CAT | CAT |
| 2 | | CAT | | DOG |
| 3 | CAT | DOG | | DOG |
| 4 | CAT | CAT | DOG | DOG |
| 5 | DOG | | CAT | CAT |
| 6 | DOG | DOG | DOG | DOG |
| 7 | | | DOG | DOG |
| 8 | | DOG | CAT | DOG |
| 9 | | | | |
| 10 | | | | CAT |

| FIND "DOG" STEP | MATCH ITERATORS 808a Field1 | 808b Field2 | 808c Field3 | 808d Field4 | VALUE ITERATORS 810a Field1 | 810b Field2 | 810c Field3 |
|---|---|---|---|---|---|---|---|
| 1 a, b, c | 1 | 1 | | | | | |
| 2 a, b | 5 | 3 | 4 | 2 | | | |
| 2 c | 5 | | 4 | 2 | 3 | 2 | 4 |
| 2 d, e | 5 | 3 | 4 | | 3 | | |
| 2 f | | 7 | | 3 | 3 | 2 | |
| 2 g, h, i | 5 | 7 | 4 | 4 | 4 | 5 | |
| 2 j, k, l, m | 6 | 7 | 7 | 7 | | | |
| 3 a, b, c, d | 2.15E+09 | 7 | 7 | 7 | | | |
| 4 a, b | 2.15E+09 | 9 | 8 | 8 | 2.15E+09 | | |
| 4 c, d | 2.15E+09 | 9 | 2.15E+09 | 9 | 2.15E+09 | 9 | |
| 5 a, b | 2.15E+09 | 2.15E+09 | 2.15E+09 | 2.15E+09 | 2.15E+09 | | |
| 5 c, d | | | | | | | |
| 6 a, b | | | | | | | |
| 6 c, d | | | | | | | |
| 7 a, b | | | | | | | |

FIG. 8

SYSTEM AND METHOD FOR SEARCHING CHAINS OF REGIONS AND ASSOCIATED SEARCH OPERATORS

CROSS-REFERENCE TO RELATED APPLICATION(S)

This application claims a benefit of priority under 35 U.S.C. § 119 to U.S. Provisional Application No. 62/504,606, filed May 11, 2017, entitled "SYSTEM AND METHOD FOR SEARCHING CHAINS OF REGIONS AND ASSOCIATED SEARCH OPERATORS," by inventors Pidduck and Ramsahai, which is hereby incorporated herein for all purposes.

TECHNICAL FIELD

This disclosure relates generally to search engines. More particularly, this disclosure relates to systems and methods for search engines that facilitate specification of complex search queries using simple operators and are capable of efficient implementation of these queries.

BACKGROUND

A search engine is a computer program used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including documents for various editing applications, emails, workflows, etc. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

Generally, there are two basic methods for selecting a set of results from a corpus based on a search query. In the first method, an item that meets the explicit search terms of the search query will be selected. Only items of the corpus that meet the explicit requirements of the search terms are selected and presented. In the second method, for some types of applications, the set of results selected is constrained (or further constrained) by a relevance measure. In particular, results selected by evaluating a search query as an explicit query are further scored and ordered by some criteria, and only the highest results are selected. Relevance scoring may incorporate variables such as the frequency of terms, weights on results with certain values or in specified metadata fields, distance from a value or a date, similarity to other results or objects, etc.

These types of searches may be employed in various different contexts and for various different purposes; however, in certain contexts one or the other type of search may prove more or less useful or apropos for a certain task. Certain areas have, however, proved difficult to the application of searches of either type. Examples of such searches involve searches of certain fields (or regions) where the fields may, or may not, exist for particular documents within the corpus.

When employing search in association with such systems that may maintain regions, determining the meaningful regions to search and which to search may be difficult as these fields may or may not exist or be populated with respect to different documents in the corpus. Accordingly, it may be desired to search objects based on the values within these regions, accounting for the presence (or lack of) a value in these regions, or a priority of these regions.

Traditional search systems do not support the ability to conduct these types of searches. Thus, to implement a search of this type a user must construct a search query that explicitly enumerates each of the possible alternatives. This enumeration process is complex and not easily understood or accomplished by most users. Moreover, these searches (even when optimized) tend to be inefficient. Accordingly, the implementation of a search according to such search queries by typical search engines may consume large quantities of time, memory or other computer resources. In some cases, for certain queries, the resources required for a particular query may exceed the computing resources available or may require that certain computing resources be taken off-line and dedicated to the search in order to complete such a search.

What is needed, therefore, are systems and methods that allow simple specification of searches of multiple of regions where those regions may be prioritized, and that efficiently implement such searches.

SUMMARY

To those ends, among others, embodiments as disclosed may provide a search operator that addresses the problem of complex query construction for finding objects having a particular value in one of a prioritized set of regions (referred to as a chain of regions or region chain), where any values present in any higher priority regions may be used to determine the responsiveness of the object to the search before values in any lower priority regions. Before describing embodiments in more specificity, some additional context may be useful. As discussed, a search engine is a computer program used to index a corpus and search the indexed corpus to return objects responsive to a search. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

Certain areas have, however, proved difficult to the application of search. Examples of such searches involve searches of certain regions where the regions may, or may not, exist for particular documents within the corpus. For instance, in many content management systems, the objects may have many different fields (e.g. metadata fields) associated with each object. Oftentimes these regions are sparsely populated and may have similar or related meanings. Consider the following metadata regions that may be maintained by a content management system such as OpenText's Content Server:

| | |
|---|---|
| FileCreated | Date the document was created, as recorded by the file system on a user's computer. |
| FileModified | Date the document was last modified, as recorded by the file system on a user's computer. |
| DateManaged | Date the first version of a document was added to the Content Server. |
| VersionCreated | Date the most recent version of the document was added to the Content Server. |
| PaperDate | Date a document was created, perhaps typed. May be much earlier than a FileCreated date if the original |

| | |
|---|---|
| | typewritten document was later scanned. |
| FormatDate | A date field stored in a document as part of the file format. For example, a Microsoft Word document might keep its own internal value for creation date or modified date. |

For each document in a content management system, these regions may be optional and may be sparsely populated.

Generally, then, when employing search in association with systems such as these that maintain regions, determining the meaningful regions to search and which regions to search, may be difficult as these fields may or may not exist or be populated with respect to different documents in the corpus. Examples of these areas include searches of a corpus of documents in conjunction with litigation discovery or compliance. In particular, continuing with the above example with respect to the metadata fields of a content management system, there may be situations where it is desired to search based on meaningful dates (e.g., documents older or younger than 10 years, documents created over three years ago, etc.).

As the different regions pertaining to dates of a document may or may not be present, it may be desired to search a set of regions pertaining to the date of a document. Moreover, as some regions may contain more pertinent, reliable or otherwise desirable data, it may be desired to prioritize these regions for purposes of such a search. Again continuing with the above example, if it is desired to find documents older than 10 years in a content management system having the metadata fields listed above, it may be desired to prioritize the regions searched such that if a document has a region present (e.g., a value populated for that region) that is of a higher priority, it will be this value that will be utilized to perform the search. Moreover, it may be desired that if a higher priority region is present for a document, once it is determined whether the document meets the search criteria based on this higher priority region, the document will be excluded from further consideration using any lower priority regions.

So, for example, suppose it is desired to search for documents older than ten years in a content management system having the regions defined above using the priority of regions PaperDate, FileModified, FileCreated, FormatDate, VersionCreated (ordered from highest to lowest priority). This search may be outlined as follows:

```
If objects have the PaperDate defined,
    find all objects with PaperDate older than 10 years,
Else
    If objects have the FileModified defined,
        find all objects with FileModified older than 10 years,
    Else
        If objects have the FileCreated defined,
            find all objects with FileCreated older than 10 years,
        Else
            If objects have the FormatDate defined,
                find all objects with FormatDate older than 10 years,
            Else
                If objects have the VersionCreated defined,
                    find all objects with VersionCreated older than 10 years,
                Else
                    find all objects with DateManaged older than 10 years.
```

Traditional search systems do not support the ability to conduct these types of searches. Thus, to implement a search of this type, a user must manually construct a search query that explicitly enumerates each of the possible alternatives. This enumeration process is complex and not easily understood or accomplished by most users. Moreover, these searches (even when optimized) tend to be inefficient from a computational and computer resource standpoint. Accordingly, the implementation of a search according to such search queries by typical search engines may consume large quantities of time, memory or other computer resources. In some cases, for certain queries of this type, the resources required for a particular query may exceed the computing resources available, or may require that certain computing resources be taken off-line and dedicated to the search in order to complete such a search.

Continuing with the above example, an enumerated search to find documents older than 10 years in a content management system having the metadata fields listed above may be:
PaperDate=older than 10 years or (PaperDate=null and FileModified=older than 10 years) or (PaperDate=null and FileModified=null and FileCreated=older than 10 years) or (PaperDate=null and FileModified=null and FileCreated=null and FormatDate=older than 10 years) or (PaperDate=null and FileModified=null and FileCreated=null and FormatDate=null and VersionCreated=older than 10 years) or (PaperDate=null and FileModified=null and FileCreated=null and FormatDate=null and VersionCreated=null and DateManaged=older than 10 years)

Although such a search may be manually constructed explicitly by an extremely knowledgeable user, these types of search are inefficient, needing $n(n+1)/2$ (quadratic) terms to evaluate (e.g., for 10 regions, 55 terms are needed). Even in cases where such a query may be refactored or optimized, such an optimized search query may be on the order of a high coefficient linear search (e.g., $>2n-1$). Thus, not only are such searches extremely difficult for a user to construct, but even if they can be constructed, they result in a large consumption of computing resources, including processing time and memory.

What is needed, therefore, are systems and methods that allow simple specification of prioritized searches of chains of regions and that efficiently implement such searches.

To those ends, among others, embodiments as disclosed may provide a search operator that addresses the problem of complex query construction for finding objects having a particular value in one of a prioritized set of regions (referred to as a chain of regions or region chain), where any values present in any higher priority regions may be used to determine the responsiveness of the object to the search before values in any lower priority regions. In other words, according to certain embodiments, if a value is present in a higher priority region that does (or does not) match a search criteria, this value may be used to determine responsiveness to the search, regardless of if a value is present in any lower priority regions, or what those values may be.

Moreover, embodiments as disclosed herein may efficiently implement the searches specified by such region chain operators using a region chain process that combines results from a set of region processes where only two processes may be needed for each region in the region chain.

Embodiments of this region chain operator may take almost any form desired and be utilized with other operators traditionally used with search queries, as are known in the art. These region chain operators may also utilize almost any syntax desired to specify a search for a number of terms. For example, in some embodiments a search system may allow a region chain to be defined statically and assigned a name as follows: RegionChain "name"=["Region1, Region2, Region 3, . . . Region N"] or CHAIN "staticregionname" "Region1, Region2, Region3, RegionN", where the regions are listed from highest priority to the lowest priority. The definition of these regions can then be stored such that for each object in the corpus, the evaluation of the named region will return the value for the highest priority region in which a value exists (if a value exists in any of the regions defined). A search query can then reference the "name" or "staticregionname" defined for the chain of regions. Such a static approach may be convenient in scenarios where region chains are well defined or certain chains of regions are utilized frequently.

Thus, for example, to statically define a region chain for the priority of regions discussed above, the definition may take the form RegionChain KeyDate=[PaperDate, FileModified, FileCreated, FormatDate, VersionCreated, DateManaged]. The search could then take the form: [region "KeyDate"]<10 years. For each object in the search system, the region "KeyDate" will return the value of the highest priority region of the prioritized regions PaperDate, FileModified, FileCreated, FormatDate, VersionCreated, DateManaged in which any value exists. This value can then be checked against the less than 10 year search criteria to determine if the object is responsive to the search.

Search operators may also be provided in certain embodiments that allow region chains to be dynamically defined at the time of the search by the user. For example, a "first" or equivalent type of operator may be provided where the user may specify this search operator along with a chain of regions and a value. Such an operator may be defined, for example, as [first Region1, Region2, Region 3, . . . Region N] "value" where the regions are listed from highest priority to the lowest priority and the "value" is the criteria to evaluate the values of the set of regions against. Again, a search according to this type of operator will compare the value for the highest priority region in which a value exists (if a value exists in any of the regions defined) for each object to the "value" search criteria to determine if the object is responsive to the search.

Again continuing with the above example, a search for the chain of regions discussed could take the form [first FileModified, FileCreated, FormatDate, VersionCreated, DateManaged]<10 years. For each object in the search system, this search will determine the value of the highest priority region of the prioritized regions PaperDate, FileModified, FileCreated, FormatDate, VersionCreated, DateManaged in which any value exists. This value can then be checked against the less than 10 year search criteria to determine if the object is responsive to the search.

It will be noted that while the examples given above pertain to dates, the same concepts may apply equally well to other types of regions, such as those that focus on people or names (e.g., there may be a chain of regions each associated with an Author or "created by" field that need to be searched for a name), classification, category of objects, or other types of regions. Moreover, other variations on operators, syntaxes and uses are imaginable and contemplated herein. For example, while embodiments have generally been presented with respect to a chain of regions based on a priority hierarchy, other embodiments may allow an evaluation of all the regions of a chain regardless of order or priority, or may evaluate the regions of a chain based on the lowest/smallest or highest/largest value in the chain of regions, an average of any values for the chain of regions, a shortest or longest string value in the chain of regions or other criteria associated with chain of regions.

Embodiments as presented herein may thus have a number of advantages. By implementing such a region chain process, the search problem of prioritized searching of a set of regions that may be sparsely populated may be solved efficiently at the process and search tree level as opposed to at the query level (e.g., by expanding such a query manually, or expanding it through automatic syntax rewriting). Thus, using such a region chain process, this prioritized searching of regions may be implemented in a manner that would be cumbersome and difficult to do at a query construction level. Accordingly, embodiments may avoid the need to execute such huge queries and provide many technical improvements in the functioning of the computer when applying such region chain searching, including the use of fewer computer resources such as disk accesses, memory or processor cycles and reducing the time needed to execute such a search. Moreover, embodiments of such search operators may be usefully applied in a variety of contexts.

Additionally, embodiments as disclosed may improve the functioning of a computer, both from a processing efficiency standpoint, a speed standpoint and a computer resource usage standpoint by utilizing fewer (and faster) processes that reduce time of execution, number of compute cycles required for execution and memory usage required for execution. For example, as discussed, typically these types of searches may require on the order of $n(n+1)/2$ (quadratic) terms to evaluate (e.g., for 10 regions, 55 terms are needed) and may require $4n-3$ processes (including end point and operation evaluation elements). Embodiments as disclosed herein may only require $2n-1$ processes.

Moreover, embodiments may also be utilized to return the region or regions used in matching the query. From a functionality and usability standpoint, embodiments may also have the advantage of simplicity: users are more likely to construct a useful and meaningful search when a simple operator for their desired functionality is available, as opposed to having to construct long and complicated manual queries.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 1A and 1B depict example search trees.

FIG. 1C depicts one example of a search tree for an example use of a region chain operator.

FIG. 8 is a table illustrating example data.

DETAILED DESCRIPTION

Figure 2A:
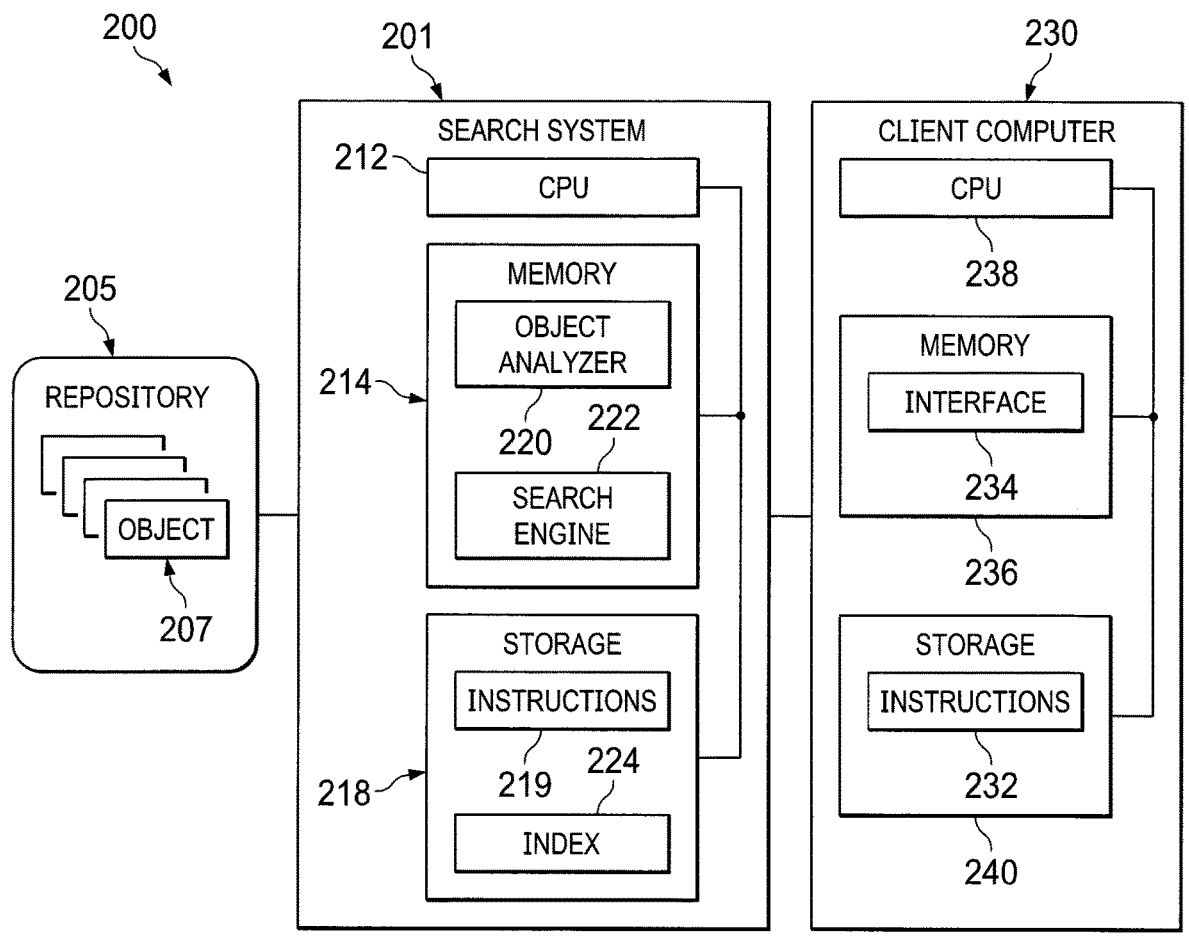
FIG. 2A is a block diagram of one embodiment of an architecture including a search system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed, certain areas have, however, proved difficult to the application of searches. Examples of such searches involve searches of certain fields (or regions) where the fields may, or may not, exist for particular documents within the corpus. For instance, in many content management systems the documents (e.g., objects) may have many different fields (e.g. metadata fields) associated with each document. Often times these regions are sparsely populated and may have similar or related meanings.

Generally, then, when employing search in association with such systems that may maintain regions, figuring out the meaningful regions to search and which to search may be difficult as these fields may or may not exist or be populated with respect to different documents in the corpus. In particular, when a set of related regions may be present in association each object, it may be desired to prioritize the regions searched such that if an object has a region present (e.g., a value populated for that region) that is higher priority, it will be this value that will be utilized to evaluate the responsiveness of that object to the search. Moreover, it may be desired that if a higher priority region is present for a document, once it is determined if the document meets the search criteria based on this higher priority region, the document will be excluded from the search based on any lower priority regions.

As traditional search systems do not support the ability to conduct these types of searches, to implement a search of this type in a traditional search system, a user must construct a search query that explicitly enumerates each of the possible alternatives. This enumeration process is complex and not easily understood or accomplished by most users. Moreover, these searches (even when optimized) tend to be inefficient. Accordingly, the implementation of a search according to such search queries by typical search engines may consume large quantities of time, memory or other computer resources and may need on the order of n (n+1)/2 terms to evaluate.

Moreover, in actual practice, a search query may have many other criteria (dates, metadata values, other text terms, etc.). As one can imagine, creating search queries for more complex scenarios will quickly exceed a (searching) user's capacity to easily and correctly build a search query. This problem arises in no small part because in a binary tree approach to implementing a search, each binary operator of the search tree may be a node that includes two sub-nodes, where each of these sub-nodes may be either another operator node or may include a search term node (e.g., as a leaf node). Thus, traditional search engines construct search trees made up of unary or binary iterators in the tree and term iterators at the leaves of the tree. Each term iterator's scope is limited to one term and each binary operator process is limited to two terms. Such constraints lead to extremely complex queries, even for a small number of terms.

Accordingly, the implementation of such search queries by typical search engines may consume large quantities of time, memory or other computer resources. In some cases, for certain queries, the resources required for a particular query may exceed the computing resources available or may require that certain computing resources by taken off-line and dedicated to the search in order to complete such a search. At least in part, this situation may result from the manner in which these types of searches are implemented by typical search engines. As mentioned, most search engines function by evaluating a search using a binary tree approach where binary search operators are involved. To illustrate in more detail, almost all search engines (e.g., full text search engines) maintain an index. This index may include, for example, an inverted copy of the indexed information. So, for example, assume that the corpus of documents being indexed includes three documents with the following values in a "Name" region:

Object 1—"Water, Rivers and Lakes"
Object 2—"Rivers, Dams and Rainfall"
Object 3—"Rivers and Ponds"

For the above example an inverted index (also called the posting list) for the "Name" region may look similar to:

And—1, 2, 3
Rivers—1, 2, 3
Lakes—1
Rainfall—2
Ponds—3
Water—1
Dams—2

Such an index indicates that the term "And" appears in objects 1, 2 and 3, the term "rivers" appears in objects 1, 2 and 3, the term "lakes" appears in object 1, the term "Ponds" appears in object 3, etc.

FIG. 1A depicts a representation of an example search tree for the search "(stream AND pond AND lake AND river AND water)". Here, each term node 102 represents a process that searches, determines and provides objects of the corpus that includes the labeled term. In other words, a process may access the index to determine which objects of the corpus include that search term. For example, term node 102a represents access to the index to identify objects that include the term "stream". Similarly, term node 102b represents access to the index to identify objects that include the term "pond." Operator node 104a represents a process that will union or otherwise combine the objects returned by the process associated with term node 102a and the process associated with term node 102b to determine the objects that contain both the term "stream" and the search term "pond". As can be seen, the search "(stream AND pond AND lake AND river AND water)" requires at least five term processes 102 for the search terms and four binary operator processes 104 for each of the operators.

As can be imagined from the depiction of this simple search, the associated number of processes, associated computer power, memory, time, etc., quickly become untenable when discussing search queries like those enumerated above for prioritized chains of regions. To illustrate further, FIG. 1B is a block diagram depicting a representation of an example search tree for the search "(stream AND pond AND lake AND river AND water) OR (creek AND pond AND lake AND river AND water)". As can be seen, the size and complexity of the search tree may grow rapidly based on the number of operators or permutations involved in the search, despite that the number of actual terms involved (e.g., water, river, lake, pond, stream, creek, rain, rainfall, dam) may be constant and relatively few in number.

Embodiments as disclosed herein may address these deficiencies and disadvantages by allowing simple specification of prioritized searches of chains of regions and efficient implementation of such searches. Specifically, embodiments as disclosed may provide a search operator (generally referred to as a region chain operator) that addresses the problem of complex query construction for finding objects having a particular value in one of a prioritized set of regions (referred to as a chain of regions or region chain), where any values present in any higher priority regions may be used to determine the responsiveness of the object to the search before values in any lower priority regions are considered.

In other words, according to certain embodiments, if a value is a present in a higher priority region that does (or does not) match a search criteria, this value may be used to determine responsiveness to the search, regardless of if a value is present in any lower priority regions or what those values may be. Moreover, embodiments as disclosed herein may efficiently implement the searches specified by such region chain operators using a region chain process that combines results from a set of region processes where only two processes may be needed for each region in the region chain.

Embodiments of this region chain operator may take almost any form desired and be utilized with other operators traditionally used with search queries as are known in the art. The region chain operator may also utilize almost any syntax desired to specify a search for finding objects having a particular value in one of a prioritized set of regions. For example, in some embodiments a search system may allow a region chain to be defined statically and assigned a name as follows: RegionChain "name"=["Region1, Region2, Region 3, . . . Region N"] or CHAIN "staticregionname" "Region1, Regions2, Region3, RegionN", where the regions are listed from highest priority to the lowest priority. For each object, the evaluation of the named region will return the value for the highest priority region in which a value exists (if a value exists in any of the regions defined). A search query can then reference the "name" or "staticregionname" defined for the chain of regions. Such a static approach may be convenient in scenarios where region chains are well defined or certain chains of regions are utilized frequently.

Search operators may also be provided in certain embodiments that allow region chains to be dynamically defined at the time of the search by the user. For example, a "first" or equivalent type of operator may be provided where the user may specify this search operator along with a chain of regions and a value. Such an operator may be defined, for example, as [first Region1, Region2, Region 3, . . . Region N] "value" where the regions are listed from highest priority to the lowest priority and the "value" is the criteria to evaluate the values of the set of regions against. Again, a search according to this type of operator will compare the value for the highest priority region in which a value exists (if a value exists in any of the regions defined) for each object to the "value" search criteria to determine if the object is responsive to the search.

By implementing such a search using a region chain process, the region chain search problem may be solved efficiently at the process and search tree level as opposed to at the query level (e.g., by expanding the query automatically or constructing such a query manually). Thus, using such a region chain process, region chain searching may be implemented in a manner that would be impossible to do at a query construction level. For example, even in the most simplified case, a conventional manually constructed query will require on the order of 4n−3 iterators (e.g., including end point and operation evaluation elements). Using a region chain process, only 2n−1 iterators may be required both speeding up the search and reducing the computation resources required to implement such a search.

Accordingly, embodiments may avoid the need to execute such huge queries and provide many technical improvements in the functioning of the computer when applying such region chain searching, including the use of fewer computer resources such as disk, memory or processor cycles, and may require less time to execute. Moreover, embodiments of such search operators may be usefully applied in a variety of contexts.

Before describing embodiments in detail, it may be helpful to discuss an example of a search system. FIG. 2A depicts a block diagram illustrating an example of computing environment 200 having object repository 205, search system 201, and client computer 230. Object repository 205 may comprise a file server or database system or other storage mechanism remotely or locally accessible by search system 201. Object repository 205 may store objects 207 (e.g., documents, images, emails or other objects) that may be searchable by search system 201.

In the embodiment of FIG. 2A, search system 201 comprises a server having central processing unit 212 connected to memory 214 and storage unit 218 via a bus. Central processing unit 212 may represent a single processor, multiple processors, a processor(s) with multiple processing cores and the like. Storage unit 218 may include a non-transitory storage medium such as hard disk drives, flash memory devices, optical media and the like. Search system 201 may be connected to a data communications network such as the Internet, a local area network (LAN), a wide area network (WAN), a cellular network or some other network or combination of networks.

Storage unit 218 stores computer executable instructions 219 and index 224. Computer executable instructions 219 can represent multiple programs or operating system code. In one embodiment, instructions 219 are executable to provide object analyzer 220 and search engine 222. Object analyzer 220 and search engine 222 may be portions of the same program or may be separate programs. According to one embodiment, for example, object analyzer 220 is a component of a document management system or content management system while search engine 222 is a separate program that interfaces with the document or content management system. Furthermore, object analyzer 220 and search engine 222 can be implemented on different computing systems and can, themselves, be distributed.

Index 224 may include metadata used to identify objects in response to a search query and may also include text used to identify objects. Specifically, as discussed above the index 224 may include an inverted copy of the indexed object. An inverted index may therefore contain a set of terms along with the an identification of which objects contain those terms Index 224 can include a single index containing metadata and text, separate metadata and text indexes or other arrangements of information. While shown as a single index, index 224 may include multiple indices. Further, index 224 may be partitioned, with different objects being represented in each partition.

Client computer system 230 may include components similar to those of the server of search system 201, such as CPU 238, memory 236, and storage 240. Additionally, client computer system 230 may include executable instructions 232 to provide user interface 234 that allows a user to enter a search query. These instructions 232 may have, for example, been provided by search system 201 in response to an access by client computer 230. User interface 234 may be provided through a web browser, file system interface or other program.

Those skilled in the art will appreciate that search system 201 shown in FIG. 2A is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 230 may include any suitable desktop computer, laptop, mobile device, server or other computing system.

In operation, object analyzer 220 may analyze objects in object repository 205 to determine information to be indexed in index 224. When an object 207 is added to search system 201, two types of information are generally indexed, one or both full text and metadata. As an example, suppose object 207 being added to search system 201 is a text file. The text or content of the file is indexed as well as information about the file. In some cases, the metadata itself may include important information associated with the object 207. This metadata may need its own descriptive metadata indicating attributes of the metadata. In some cases, the metadata on its own without full text content is sufficient to represent an object. Object analyzer 220 can send indexing instructions to search engine 222 to direct search engine 222 to add, modify, or delete metadata or text in index 224.

Object analyzer 220 may be a portion of a larger program, such as a document or content management program, may be a separate program or may be implemented according any suitable programming architecture. In one embodiment, the process of determining metadata and text to be indexed may be carried out by any number of different programs on a computer system or distributed across computer systems. Detailed discussions concerning an example of an object analyzer can be found in U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

When a search query is received at search system 201, search engine 222 can search the information in index 224 to identify objects (content) 207 responsive to the search query and return a list or other representation of those objects 207 to client computer 230.

Figures 2B, 4:
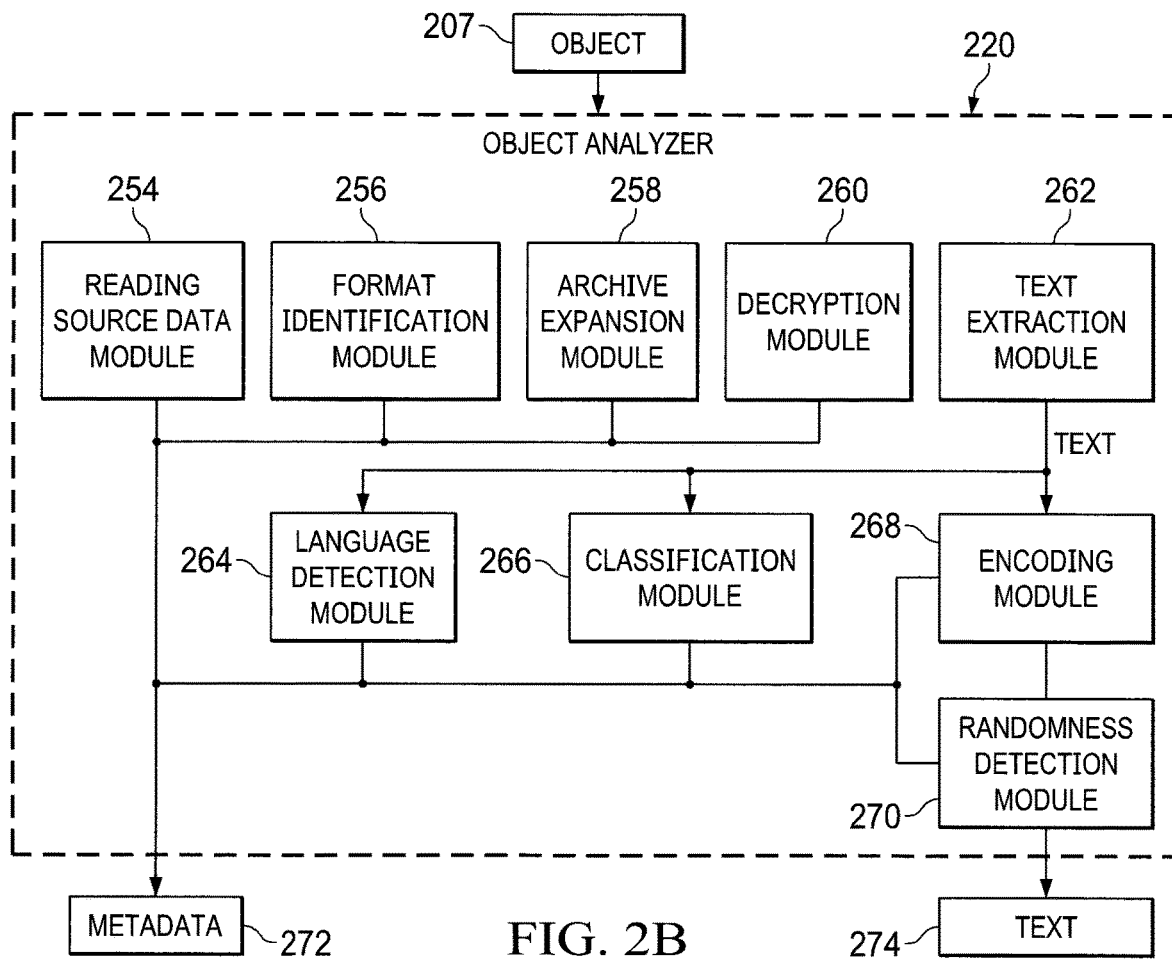
FIG. 2B is a block diagram of one embodiment of an object analyzer.
FIG. 4 is a block diagram of one embodiment of regions or fields for a portion of an index.

FIG. 2B depicts a diagrammatic representation of one embodiment of an object analyzer 220 for analyzing an object 207. Object analyzer 220 can comprise various modules to process an object 207. Reading source data module 254 can open the object 207. Format identification module 256 examines the object to determine what type of file or data the object 207 comprises. Archive expansion module 258 unzips files or otherwise decompresses files if the object 207 is a compressed file. Decryption module 260 decrypts all or part of the data in the object 207. Text extraction module 262 applies rules to text in the object 207 to extract text for index 224. Language detection module 264 examines the text to determine the language in which the text is written. Classification module 266 applies rules based upon text and metadata to classify content. Encoding module 268 can convert text to a supported encoding. Randomness detection module 270 can analyze data to be indexed to reject random information.

Object analyzer 220 may include modules that can derive metadata for object 207. For example, a document management system may provide a limited amount of metadata with the object 207. Object analyzer 220 can derive other metadata from the metadata provided, text or other properties of the object 207. As a specific example, a filter or piece of code that extracts the text from a PowerPoint presentation might also create metadata about the presentation. In this example, the metadata which is not provided by the document management system and which is derived by object analyzer 220 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2B is provided by way of example. Object analyzer 220 may include any number of other modules to analyze an object and extract text 274 and metadata 272 to be indexed. Object analyzer 220 may be a portion of a larger program, such as a document management program, may be a separate program or may be implemented according any suitable programming architecture. In one embodiment, the process of determining metadata 272 and text 274 to be indexed may be carried out by any number of different programs on a computer system or distributed across computer systems.

Figure 3:
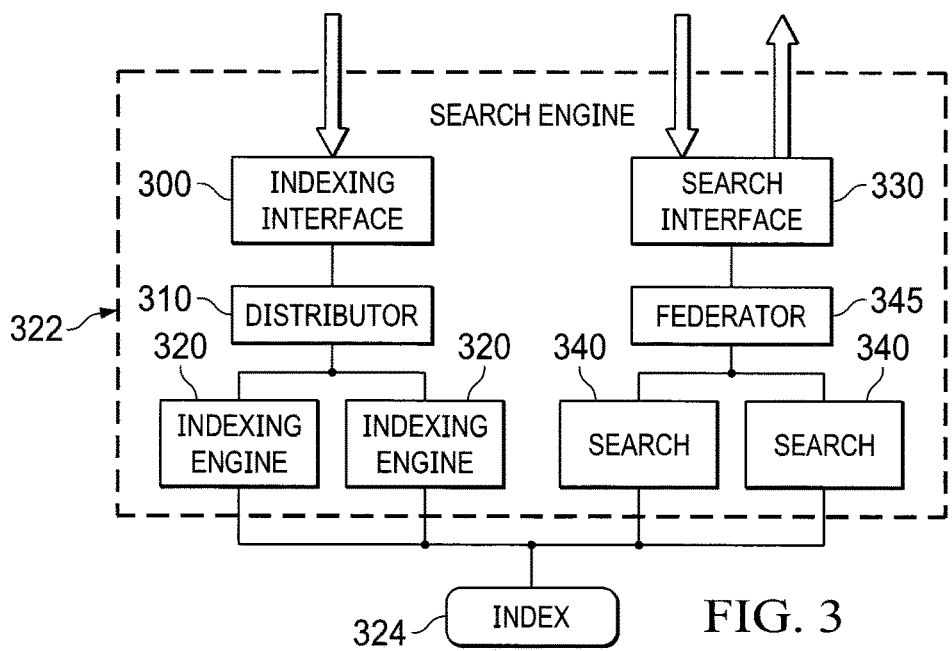
FIG. 3 is a block diagram one embodiment of a search system.

Metadata 272 and text 274 thus processed by object analyzer 220 may be provided to a search engine. An example search engine will now be described with reference to FIG. 3. Specifically, FIG. 3 depicts a diagrammatic representation of logical blocks for one embodiment of search engine 322. Search engine 322 may provide indexing interface 300 that receives indexing requests (e.g., from object analyzer 220) or another source. A distributor module 310 may distribute the indexing requests to indexing engines 320 that act on the indexing requests to update index 324. Search engine 322 may also include search interface 330 to receive queries (e.g., from a user, a content server or other source). Search interface 330 may send queries to search modules 340. These queries may be sent or distributed through federator 345 which may serve as a coordinator for the search modules 340. Each of the search modules 340 may be a search process configured search the corpus based on a related search term.

The coordinator may determine search modules (processes) 340 to instantiate based on the terms of the received query and instantiate those search modules 340. For example, the coordinator may define the search modules 340 and a hierarchy in order to define a search tree of the search modules 340 corresponding to the received query. The coordinator may then instantiate search modules 340 and provide each module 340 with the data (e.g., related sub modules 340, search term for the search module 340, etc.) needed to process the search tree. The federator 345 may then obtain results from one or more of the search modules 340 (e.g., the search module 340 that is a root node of the search tree) and generate a response to the query received through search interface 330. This response may identify one or more responsive objects. Search modules 340 are responsible for implementing a term process for one or more terms using index 324 or implementing an operator process for a search operator, a match iterator for matching a value, a value iterator for all values in a region, performing searches on an index partition, and performing tasks such as computing relevance score, sorting results, and retrieving metadata regions to return in a query. Thus, a search tree may include a set of hierarchically arranged search modules 340 as nodes of the search tree, each search module 340 being a term process or an operator process.

Search interface 330 may be configured to receive a search query from a user, and search index 324 for objects that meet the criteria set forth in the search query. Query languages may also be configured to permit sorting results of a search. Various rules may be used to determine the sort order. While users construct a search query, it should be noted that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following: phrases, numbers, strings, logical operations (e.g., AND, OR, NOT, SUBSET, STEM, etc.), ordering or operations (e.g., using parentheses), relationships (e.g., greater than, less than, not equal to, etc., similarities based on thesaurus, stemming, sounds-like, etc., wildcards and pattern matching or the like. To this end, a search term can also refer to any term that is used in a query and that has been modified or generated by any commonly used techniques. For context, a search term could be a word "john" or a more complex expression like:

(>"bob" or !=("123" or a*)) and (sounds-like "smith" or thesaurus "doctor" or "medical doctor" or stem "medical").

The embodiment of FIG. 3 is provided by way of example. Search engine 322 may include any number of other modules or configurations to update and search index 324. For example, search modules 340 and indexing engines 320 may be a single module. Search engine 322 may be a portion of a larger program, such as a document management program or content management system, may be a separate program or may be implemented according to any suitable programming architecture. Furthermore, the processes of search engine 322 may be distributed across multiple computer systems. Additionally, while in FIG. 3, index 324 is illustrated as a single index, index 324 may comprise a set of smaller indexes. For example, a separate index can be used or updated by each indexing engine FIG. 4 depicts a diagrammatic representation of one embodiment of regions or fields for a portion of index 324. Index 324 includes a list of some or all objects 207 in repository 205 (FIG. 2A), each identified by a unique identifier 401 (also referred to as object ID). Index 324 further includes a set of metadata regions 400 (also referred to as metadata fields). A metadata field 400 may include more than one entry for an object. The metadata fields can each have associated values in value storage locations within storage unit 218. In other embodiments, the values may be discarded. The index may include a list of dictionary terms contained in the metadata values of the object and pointers to where the metadata values corresponding to the field are stored. Index 324 may also include other regions for an object, such as a text region 402. Text region 402 may, for example, include a list of terms in the text of an object. Index 324 may include some or all of the content of an object.

While shown as a single index, index 324 may be partitioned. In index partitioning, in one embodiment, the index of objects in repository 205 may be split into multiple indexes such that some objects are listed in one index partition, while other objects are listed in the other index partitions. As described below with reference to FIGS. 5 and 6, a 'partition' comprises a portion or fragment of index 324 and is associated with indexing engine 320 and search module 340. Note that it is possible to copy a partition and associate a different index engine and search engine with this copied partition. Index partitioning may also reduce resource usage and search time. Furthermore, separate indexes may be maintained for metadata and text or different metadata regions or fields. Index 324 can be stored according to any suitable storage scheme. Example storage schemes may include "Memory Storage," "Disk Storage" and "Retrieval Storage":

Memory Storage: in this storage scheme, all the elements of the index are kept in memory. This provides the fastest operation when search results must be retrieved, since the memory storage mode minimizes disk activity. Conversely, memory storage consumes the most memory in partitions. For example, text regions which are frequently searched and retrieved for display may be held in memory.

Disk Storage: in this storage scheme, the dictionary and index are kept in memory, but the value storage is located on disk within a Checkpoint file. Keyword searches are still fast, but search queries which need to examine the original data, such as phrase searches, are generally slower. Retrieving values from disk for display is also slower. For regions which are not commonly searched and displayed, disk storage may be a desirable choice. Disk storage is also suitable as a storage mode for systems utilizing solid state hardware.

Retrieval Storage: in this storage scheme, storage is optimized for text metadata regions which need to be retrieved and displayed, but do not need to be searchable. As an example, text values may be stored on disk within the Checkpoint file, and there is no dictionary or index at all. This storage scheme can be used, for example, for regions such as Hot Phrases and Summaries.

Figure 5:
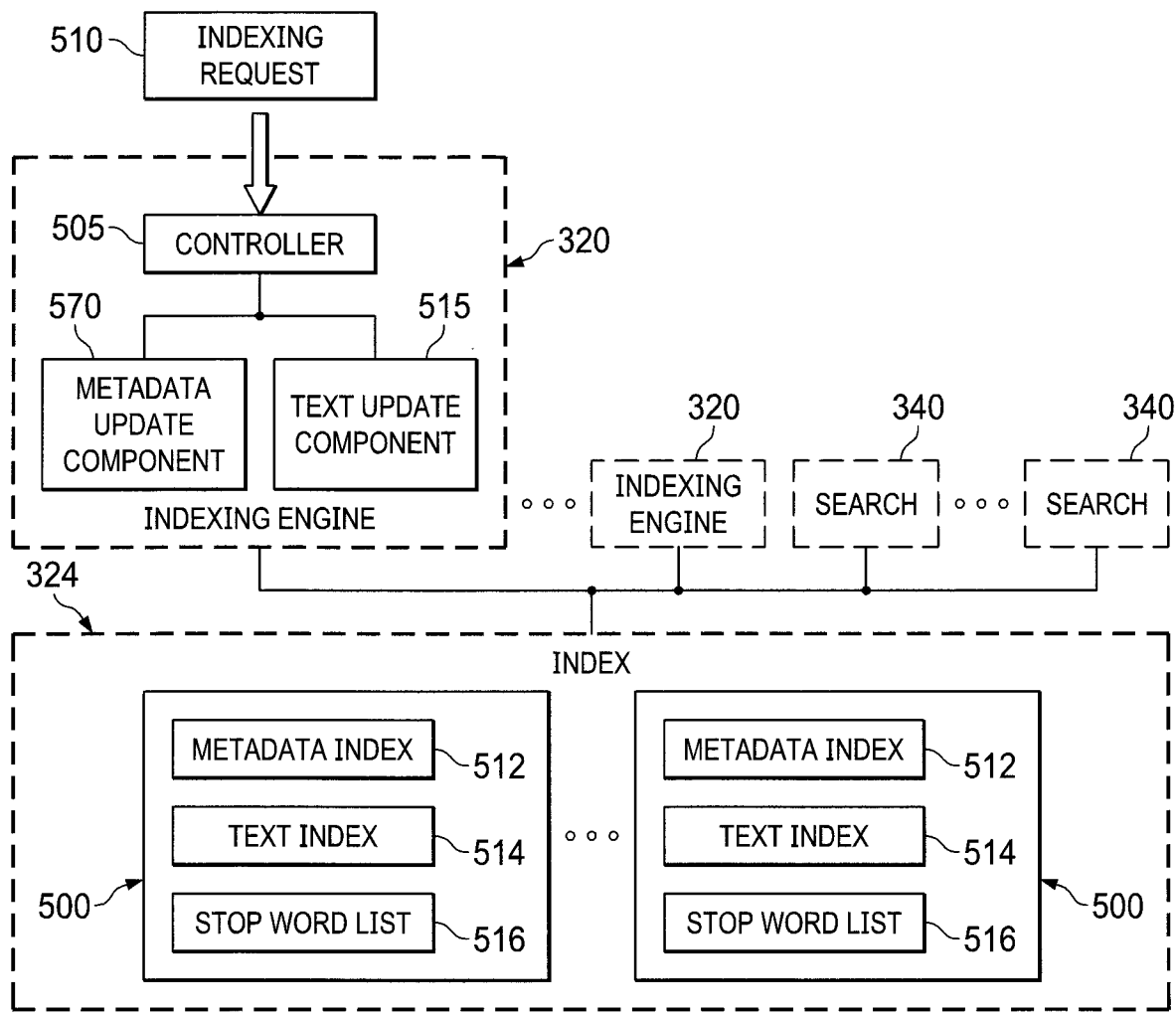
FIG. 5 is a block diagram of one embodiment of an indexing engine.

FIG. 5 depicts a diagrammatic representation of one embodiment of an indexing engine 320 to maintain a partition of index 324. Here, for example, index 324 is divided into "n" partitions 500, with each partition including a metadata index 512, a text index 514 indexing a portion of the objects of the corpus and a stop word list 516 for each based on the objects of the corpus of objects associated with that partition 500 of the index 324 or all partitions 500 of the index 324. Thus, each stop word list 516 may be specific to the objects of the corpus associated with that partition. A stop word list 516 may be created at some time interval or based on some other condition. In this embodiment, indexing engine 320 can include an indexing controller 505, a metadata update component 570, and a text update component 515. In this embodiment, index 324 is maintained as a separate metadata index 512, which contains metadata for objects 207 in repository 205, and text index 514, which contains content text from objects in repository 205, with a known relationship between the text and metadata components for each object in the index.

Indexing controller 505 receives indexing requests (e.g., from a distributor, another application or other source). An indexing request 510 received at the indexing controller 505 may include an instruction to add an object, delete an object, modify an object or replace an object in index 324. Such an indexing request may also include the information to be added or changed, such as the full text content to be indexed and the associated metadata for the object. An indexing request may also contain derived metadata.

The text (derived text or full text content) of an indexing request 510 may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request 510 may specifically be provided by an application providing the indexing request. This might be data such as an identifier for the object, the date or time it was first added to the system, or the identity of the user who manages the object.

A portion of the metadata can be derived metadata. Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request 510 from an application, distributor or other source. Indexing request 510 specifies an operation to be taken on index 324 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add. This function may distinguish between content and metadata. If an object already exists and metadata only is provided, the existing full text content is retained.

AddOrModify: this operation will update an existing object or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 505, according to one embodiment, is a component which interprets the indexing request 510 to determine how it should be processed. Indexing controller 505 can identify whether a text indexing command exists, and if so, send the command with the necessary parameters to the text update component 515. Indexing controller 505 can likewise determine if any metadata indexing operations are required, and if so, send the command with necessary parameters to the metadata update component 570.

Text update component 515 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

Metadata update component 570 is responsible for processing requests to index metadata 512 associated with an object in index 324. This may include building and maintaining dictionaries of search terms, maintaining internal search data structures, and updating the representation of the metadata portion of the search index in memory or on disk as appropriate. Metadata update component 570 may support instructions such as Add an Object, Replace an Object, or Delete an Object.

The embodiment of FIG. 5 is provided by way of example. Indexing engine 320 may include any number of other modules to update and search an index. Indexing engine 320 may be a portion of a larger program, such as a document management program, may be a separate program or may be implemented according any suitable programming architecture. In one embodiment, the processes of indexing engine 320 may be distributed across multiple computer systems.

As discussed above, an index may be partitioned. For example, in order to scale to large sizes, the search index may be broken into partitions. When new objects are added to the search index, a method of determining which partition should be the recipient of the new data is required. For example, one strategy may include allocating partitions based on a modulus of an object identifier (ID). As another example, a round-robin technique may be used to add new objects to partitions which have available capacity. One skilled in the art of computing will understand that there may be many possible strategies.

Figure 6:
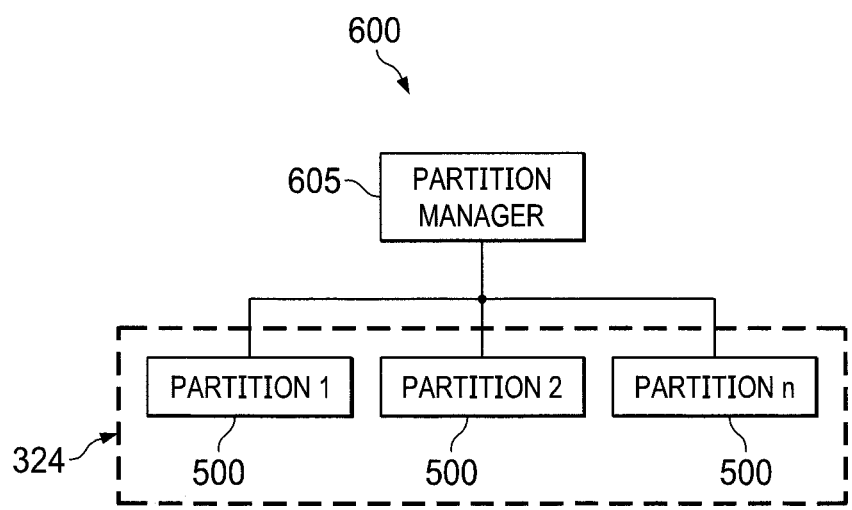
FIG. 6 is a block diagram of one embodiment of an index with multiple partitions connected to and being managed by a partition manager.

FIG. 6 depicts a diagrammatic representation of one embodiment of system 600 for managing partitions. In the embodiment of FIG. 6, index 324 is divided into "n" partitions 500, with each partition including a metadata index and a text index. As illustrated in FIG. 5, in one embodiment, each partition can have its own indexing engine 320 and search module 340.

A partition manager can be configured to manage these partitions. Partition manager 605 is a component of a search system that accepts indexing requests, determines which partition should service an indexing request, and provides the indexing request to the appropriate indexing engine 320. In one embodiment, partition manager 605 can be a logical function of a search engine in the search system which, in turn, can be part of a document management system. In one embodiment, partition manager 605 can be a logical function of distributor 310 shown in FIG. 3. An indexing engine (e.g., indexing engine 320 shown in FIG. 3) for a partition performs the actual indexing operations of adding, deleting or modifying data in the partition. Likewise, partition manager 605 may be able to federate search queries to multiple search engines 340 associated with multiple partitions and combine the results. In one embodiment, this function of partition manager 605 may be incorporated in a federator (e.g., federator 345 shown in FIG. 3).

Returning then to FIG. 3, in one embodiment, a search module 340 may be implemented as an iterator. An iterator may be a process that returns a next object of the type of object for which the iterator is configured. Thus, an iterator may provide an interface or call (e.g., collectively referred to as a "next interface") to allow a requestor (e.g., another search module 340 higher in the search tree or the coordinator) to access the interface of that iterator and obtain the next object of the corpus that is responsive to the configuration of that iterator. An iterator may maintain a pointer or other indicator that maintains an identifier of the iterator's current position in the corpus such that it is the next responsive object in the corpus that is returned with each next call or a null indication (e.g., NULL, EOF, a maximum integer value, etc.) if the iterator has reached the end of the corpus without identifying a subsequent document responsive to the configuration of that iterator. An iterator may also be provided with a given object ID and be able to find a next object identifier starting with (e.g., inclusive of) with the provided object ID.

For example, a search term iterator for a term may provide a next interface that provides the next object (e.g., next object identifier) in the corpus that contains that search term. An operator iterator may provide a next interface that provides the next object in the corpus that meets the logical condition(s) specified by that operator with respect to the search terms associated with that operator. A match iterator may provide a next interface that can provide the next object in the corpus that has a match for a given value in a corresponding region. A value iterator may provide a next or other interface that can return if an object associated with a provided object identifier has any value in a corresponding region.

In one embodiment then, search interface 330 may allow a user to use a region chain operator in a search query. This region chain operator may take almost any form desired and be utilized with other operators traditionally used with search queries as are known in the art. The region chain operator may utilize almost any syntax desired to specify a prioritized evaluation of the values for a set of specified regions against a value. For example, in some embodiments a search system may allow a region chain to be defined statically and assigned a name as follows: RegionChain "name"=["Region1, Region2, Region 3, . . . Region N"] or CHAIN "staticregionname" "Region1, Regions2, Region3, RegionN", where the regions are listed from highest priority to the lowest priority. Such a statically defined region chain may be stored, for example, in a configuration of the search engine 322.

Region chain search operators may also be provided in certain embodiments that allow region chains to be dynamically defined at the time of the search by the user. For example, a "first" or equivalent type of operator may be provided where the user may specify this search operator along with a chain of regions and a value. Such an operator may be defined, for example, as [first "Region1, Region2, Region 3, . . . Region N"] "value" where the regions are listed from highest priority to the lowest priority and the "value" is the criteria to evaluate the values of the set of regions against. This operator may specify that for that search (or portion of a search) an object is responsive if the value for the highest priority region in which a value exists for the object is meets the search criteria or "value" specified in the operator.

Other variations on operators, syntaxes and uses are imaginable and contemplated herein. For example, embodiments may apply equally well to almost all types of regions. Moreover, other variations on operators, syntaxes and uses are imaginable and contemplated herein. For example, while embodiments have generally been presented with respect to a chain of regions based on a priority hierarchy, other embodiments may allow an evaluation of the chain of regions based on the lowest/smallest or highest/largest value in the chain of regions, an average of any values for the chain of regions, a shortest or longest string value in the chain of regions or other criteria associated with chain of regions. Other variations, syntaxes and uses are also possible.

If such a region chain operator is specified in a received search query, federator 345 may instantiate a search module 340 corresponding to the region chain operator as a node in the search tree and a set of search modules 340 based on the regions of the received query. For example, federator 345 may define the search module 340 and a hierarchy in order to define a search tree of the search modules 340 corresponding to the received query (or the portion of thereof corresponding to the region chain operator). The portion of the search tree defined by the federator 345 may include a region chain operator search module 340 as a node in the search tree where that region chain operator search module 340 has a match search module 340 and a value search module 340 as a sub-node for each region associated with the subset operator in the search query.

To illustrate an example, referring briefly back to FIG. 10, a search tree for the query "[first FileModified, FileCreated, FormatDate, VersionCreated, DateManaged]<10 years" is depicted. Here, operator process 120 may be a first operator process instantiated by search module 340. Each match iterator processes 130 and value iterator process 140 for each region may be an iterator search module 340 that is a sub-node of the operator search module 340 (e.g., implementing operator process 120). As will be discussed in more detail, there may be a match iterator and value iterator corresponding to each region specified in the "first" search operator, where each match iterator 130 is also provided with the less than 10 years value.

Referring again to FIG. 3, in one embodiment, a region chain operator search module 340 may be implemented as an iterator. As used in a search tree, such a region chain iterator may have a number of sub-nodes, each sub-node corresponding to a match iterator and a value iterator for one of the regions specified by the region chain operator in the original query. The region chain iterator may have a value and a priority of regions corresponding to the original query such that the region chain iterator will return an object (or identifier thereof) in response to a call to the next interface of the region chain iterator if the value for the highest priority region in which a value exists for the object meets the value.

Figure 7:
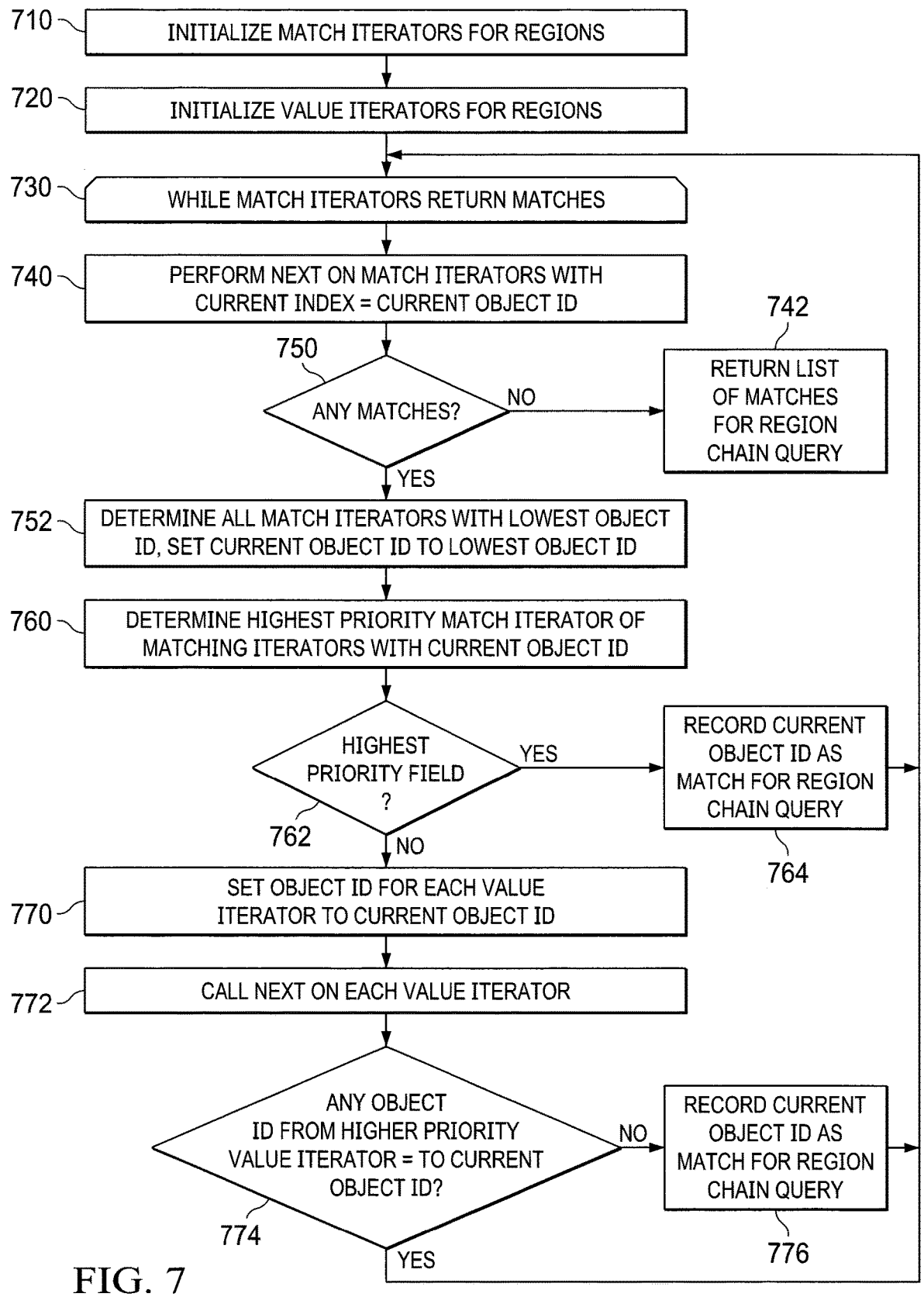
FIG. 7 is a flow diagram depicting one embodiment of a method for a region chain iterator.

Referring now to FIG. 7, one embodiment of a method for a region chain iterator is depicted. For purposes of explanation with respect to this embodiment, it will be noted that a region iterator employing the method of this embodiment will have some number of sub-nodes equal to the number of regions, each sub-node corresponding to a region identified in the region chain of a region chain operator of a query. Each sub-node includes a match iterator associated with the corresponding region and the value(s) specified in the region chain operator, and a value iterator associated with the corresponding region. Each iterator has access to an index of a corpus of objects where each object is associated with an identifier. The identifiers of the objects in this embodiment may be sequential and each iterator may maintain an indicator of a current object (which may be initialized or set to a particular object identifier). An iterator returns the next document in the sequence in response to a call to the iterator's next interface if such an object exists, and an indicator that no more data remains otherwise (e.g., NULL, end, EOF, a max integer value for the system, a particular count, a value storing the last offset, simply running out of data, etc.).

For example, for a match iterator, the next document with a higher identifier than the current indicator (assuming the identifiers are increasing in value) with a value in the corresponding region that matches the value specified in the query may be returned in response to a call to a match iterator's next interface (if it exists). Similarly, for a value iterator, the next object that has any value in the region associated with the value iterator (again assuming the identifiers are increasing in value) may be returned in response to a call to the value iterator's next interface (if it exists). For purposes of illustration with this embodiment, it will be assumed objects have sequential numerical identifiers greater than zero. In other embodiments, objects may just have identifiers that are ordered and unique. Other variations may be imagined, such as ordering the objects using link lists, trees, arrays, or in some other manner.

Accordingly, a search that includes a region chain operator may be received where the region chain operator may identify a prioritized set of regions and a value (also referred to as the search value). This region chain operator may serve as the only operator for a search or may be part of a larger search query. In either instance, a region chain iterator may be created and provided with the set of regions, the priority of these regions and the search value. A current indicator (also referred to as a current object identifier) of the region chain iterator may also be set to zero. At step 710, the match iterators that are sub-nodes of the region chain iterator may be created and initialized by setting the current object indicator of each of the match iterators to zero. There may be one match iterator for each region of the prioritized set of regions specified in the region chain operator such that each match iterator is provided with the corresponding region and the search value. Additionally, at step 720, value iterators that are sub-nodes of the region chain iterator may be created and initialized. There may be one value iterator for each region of the prioritized set of regions specified in the region chain operator, such that each value iterator is provided with the corresponding region.

In some embodiments, however, there may be no need to create and initialize a value iterator for the lowest priority field in the chain of regions specified in the region chain operator, as if a responsive value for an object is found by a match iterator in only this lowest priority region for the object, it can be determined if a value exists in any higher priority region using only value iterators corresponding to these higher priority regions. As such, a value iterator for the lowest priority region may not be created to save additional computing resources (e.g., processing cycles or memory).

Loop 730 may be performed until each of the match iterators return a max integer value (e.g., or NULL, EOF, etc.) in response to a call to their next interfaces. At step 740 then, the next interface of each match iterator whose current object indicator is equal to the current object indicator of the region chain iterator may be called. As will be noted, in the initial iteration of the loop, with both the current object identifier of the region chain and the current object identifiers for each match iterator initialized to an initial value (e.g., zero), the next interface for each match iterator may be called at step 740.

Each match iterator called will return an object identifier for the next object that has a value in the region corresponding to that match iterator that matched the search value, or alternatively a max integer value in the case no more objects have values in the corresponding region that match the search value. At step 750, it can be determined if all the match iterators have returned a max integer value, and if so, the region iterator may return the list of matching object identifiers for the region chain query at step 742. If however, there is at least one match iterator that returns an object identifier in response to the next call (or that has a current object indicator that is not a max integer value), at step 752, the lowest object identifier for all the match iterators (and the match iterators that returned this lowest object identifier) may be determined. The current object indicator for the region chain iterator can then be set to the lowest object identifier returned by all of the match iterators.

At step 760, once all the match iterators that returned (or whose current object indicator is equal to) the lowest object identifier are determined, the highest priority region of each of the regions corresponding to the set of match iterator(s) that returned this lowest object identifier may be determined. If the highest priority region of the set of match iterator(s) that returned the lowest object identifier corresponds to the highest priority region of the entire chain of prioritized regions specified in the region chain search at step 762, it indicates that the value in the highest priority region matches the search value for the object associated with the lowest object identifier, and the current object identifier (now equal to the lowest object identifier) may be added to the list of matching object identifiers at step 764.

If the highest priority region of the set of match iterator(s) that returned the lowest object identifier does not correspond to the highest priority region of the entire chain of prioritized regions specified in the region chain search at step 762, it can then be determined, for the object associated with the current object identifier, if a value exists in any region of the region chain of the search that is of a higher priority than the highest priority region of the set of match iterator(s) that returned the lowest object identifier. In particular, the object identifier of each value iterator may be initialized to the current object identifier at step 770 and the next interface of each value iterator called at step 772. It will be noted here, that when the value iterator for a particular region is initialized to a particular value for an object identifier, such a value iterator may return the next object that has any value in the particular region associated with the value iterator inclusive of the initialized object identifier. Thus, for example, if a value iterator for the "DateModified" region is initialized to object identifier "2", when the next identifier of this value iterator is called it will return object identifier "2" if the object associated with object identifier "2" has a value present in the "DateModified" region. It will also be noted that, in cases where the value iterator functions in a manner that is not inclusive of the initialized object identifier, each value iterator may be set to one less than the current object identifier (current object identifier—1) (again, in the case of sequential object identifiers for the corpus).

In response to the next call to each value iterator, the object identifiers for the next object that has a value for the region corresponding to each value iterator may be returned (if there any such objects, otherwise a maximum integer value, NULL, EOF, etc. may be returned). It can thus be determined if any of the object identifiers returned from any value iterator is equal to the current object identifier at step 774. The corresponding regions for each of the set of value iterators which returned object identifiers equal to the current object identifiers can then be used to determine if any of those value iterators are associated with a higher priority region than the highest priority region of the set of match iterator(s) that returned the current object identifier at step 774.

If there is a value iterator that returned the current object identifier and is associated with a higher priority region than the highest priority region of the set of match iterator(s) that returned the current object identifier this indicates a higher priority region contains a value non-responsive to the region chain search (e.g., that does not match the search value) and thus the object associated with the current object identifier is non-responsive to the search. In this case, the loop may return to step 740 and the next interface of each match iterator whose current index value is equal to the current object identifier may be called.

If, however, there is no value iterator that returned the current object identifier and is associated with a higher priority region than the highest priority region of the set of match iterator(s) that returned the current object identifier, this indicates that no higher priority region contains a value non-responsive to the region chain search and thus the object associated with the current object identifier is responsive to the search. In this case, the current object indicator for the region iterator (equal to the lowest object identifier) may be added to the list of matching object identifiers at step 776. The loop may then return to step 740 and the next interface of each match iterator whose current index value is equal to the current object identifier may be called.

Expressed in pseudocode, embodiments of a method for a region iterator such as that discussed that operate according to a loop that identifies all objects matching a region operator in a search may be:

1. Initialize iterators for each region
   a. One iterator to match the actual search per region (match iterators)
   b. One iterator to match all values per region (value iterators)
2. Loop—while we have not found a match
   a. Find and mark all match iterators with the lowest objet identifier
   b. Determine if the first match is the first non-null value using the value iterators
      i. Yes—this is object identifier is a match
      ii. No—advance all iterators that are at the current lowest objet identifier, return to beginning of step 2
   c. If there are no matches stop It will be helpful to an understanding of certain embodiments to illustrate an embodiment with respect to a specific example. Referring now to FIG. 8, a table including data useful for illustrating an example of a region chain search is presented. In FIG. 8, the column 802 labeled "ObjectID" indicates object identifiers of a set of example objects and the columns 804 labeled "Field1", "Field2", "Field3" and "Field4" indicate any values present for each of the objects associated with the "ObjectID" in the corresponding identified field (e.g., "Field1" is a first region, "Field2" is a second region, etc.). The column 806 labeled "Step" indicates the steps associated with the following description for a region chain search for [first: "Field1", "Field2", "Field3" and "Field4"] dog (e.g., the set of prioritized regions highest to lowest are "Field1", "Field2", "Field3" and "Field4" and the search value is "dog").

The columns 808 labeled "Match Iterators" indicate the values of the current object indicator or the values returned by the match iterators for "Field1", "Field2", "Field3" and "Field4" in association with the steps being performed in executing the specified region chain search as specified below and in the "Step" column 806, while columns 810 labeled "Value Iterators" indicate the values of the current object indicator or the values returned by the value iterators for "Field1", "Field2" and "Field3" in association with the steps being performed in executing the specified region chain search as specified below and in the "Step" column 806. Notice here, that there may be no need to have a value iterator for "Field4", as this region is the lowest priority region of the chain.

In one embodiment, a search for "[first: "Field1", "Field2", "Field3" and "Field4"] dog" may operate as follows:

Step 1: Find the first match:
  a. Find the first occurrence of the lowest matching Object ID in the matching iterators (entry 852 of column 806). In this case the object associated with the lowest Object ID "1" has a match for the search value "dog" found in Field 1 (as represented by highlighted entry 854 of column 808*a*).
  b. Check that the matching value found is the first non-null value in the chain of regions (entry 852 of column 806). Since it came from the first (highest priority) field (Field1) in the set of fields, here no check needs to be performed.
  c. Return that Object 1 is a match or add Object 1 to a list of matching objects to be returned (entry 852 of column 806).

Step 2: Continue on to find the next match:
  a. Advance match iterators that are equal to the previous match Object ID (entry 856 of column 806).
  b. Find the first occurrence of lowest matching Object ID in the matching iterators. In this case the object associated with the Object ID "2" has a match for the search value "dog" found in Field 4 (as represented by highlighted entry 858 of column 808*d*).

c. Check that the matching value found is the first non-null value in the chain of regions (entry 856 of column 806). To do this, set the Value iterators to find match at Object ID 2 (the Object ID in which the value of Field4 matched the search value "dog") (entry 860 of column 806). Here, a higher priority region Field2 had a non-matching value of Object ID 2, so Object 2 is not a match for the region chain search (as represented by highlighted entry 862 of column 810*b*).
d. Advance Match Iterators that are equal to the previous possible match of Object ID 2 (entry 864 of column 806).
e. Find the first occurrence of lowest matching Object ID in the matching iterators (entry 864 of column 806). In this case the object associated with the Object ID "3" has a match for the search value "dog" found in Field2 (as represented by highlighted entry 866 of column 808*b*).
f. Check that this matching value is the first non-null value in the chain (entry 868 of column 806). Set Value iterators to find match at Object ID 3 (the Object ID in which Field2 matched). Here, a higher priority region, Field1, has a non-matching value for Object ID 3, so Object 3 is not a match for the region chain search (as represented by highlighted entry 870 of column 810*a*).
g. Advance Match Iterators that are equal to the previous possible match of Object ID 3 (entry 872 of column 806).
h. Find the first occurrence of lowest matching Object ID in the matching iterators (entry 872 of column 806). In this case the object associated with the Object ID "4" has a match for the search value "dog" found in Field3 (as represented by highlighted entry 874 of column 808*c*).
i. Check that this value is the first non-null value in the chain. Set Value iterators to find match at Object ID 4 (the Object ID in which Field3 matched) (entry 872 of column 806). Here, a higher priority region, Field1, has a non-matching value for Object ID 4, so Object 4 is not a match for the region chain search (as represented by highlighted entry 876 of column 810*a*).
j. Advance Match Iterators that are equal to the previous possible match of Object ID 4 (entry 878 of column 806).
k. Find the first occurrence of lowest matching Object ID in the matching iterators (entry 878 of column 806). In this case, the object associated with the Object ID "5" has a match for the search value "dog" found in Field1 (as represented by highlighted entry 880 of column 808*a*).
l. Check that this value is the first non-null value in the chain (entry 878 of column 806). Since it came from the first (highest priority) field (Field1) in the set of fields, here no check needs to be performed.
m. Return that Object 5 is a match or add Object 5 to a list of matching objects to be returned (entry 878 of column 806).

Step 3: Continue on to find the next Match:
a. Advance Match Iterators that are equal to the previous match of Object ID 5 (entry 882 of column 806).
b. Find the first occurrence of lowest matching Object ID in the matching iterators (entry 882 of column 806). In this case, the object associated with the Object ID "6" has a match for the search value "dog" found in Field1 (as represented by highlighted entry 884 of column 808*a*).
c. Check that this value is the first non-null value in the chain (entry 882 of column 806). Since it came from the first (highest priority) field (Field1) in the set of fields, here no check needs to be performed.
d. Return that Object 6 is a match or add Object 6 to a list of matching objects to be returned (entry 882 of column 806).

Step 4: Continue on to find the next Match:
a. Advance Match Iterators that are equal to the previous match of Object ID 6 (entry 886 of column 806).
b. Find the first occurrence of lowest matching Object ID in the matching iterators (entry 886 of column 806). In this case, the object associated with the Object ID "7" has a match for the search value "dog" found in Field2 (as represented by highlighted entry 888 of column 808*b*).
c. Check that this value is the first non-null value in the chain (entry 890 of column 806). To do this, set the Value iterators to find a match at Object ID 7 (the Object ID in which the value of Field2 matched the search value "dog") (entry 890 of column 806). Here, the only Value iterator for the only higher priority field (Field1) returns a maximum integer value (in this example 2.15E+09) indicating there are no more matches for that Value iterator. Thus, the match in Field2 is the first non-null value in the chain.
d. Return that Object 7 is a match or add Object 7 to a list of matching objects to be returned (entry 890 of column 806).

Step 5: Continue on to find the next Match:
a. Advance Match Iterators that are equal to the previous match of Object ID 7 (entry 892 of column 806).
b. Find the first occurrence of lowest matching Object ID in the matching iterators (entry 892 of column 806). In this case, the object associated with the Object ID 8 has a match for the search value "dog" found in Field3 (as represented by highlighted entry 896 of column 808*c*).
c. Check that this value is the first non-null value in the chain (entry 894 of column 806). To do this, set the Value iterators to find a match at Object ID 8 (the Object ID in which the value of Field3 matched the search value "dog"). Here, the Value iterator for the higher priority field Field1 returns a maximum integer value (in this example 2.15E+09) indicating there are no more matches for that Value iterator and the Value iterator for the higher priority field Field2 returns the Object 9 indicating that the object with Objet ID 8 does not have a value for Field2. Thus, the match in Field3 is the first non-null value in the chain.
d. Return that Object 8 is a match or add Object 8 to a list of matching objects to be returned (entry 894 of column 806).

Step 6: Continue on to find the next Match:
a. Advance Match Iterators that are equal to the previous match of Object ID 8 (entry 898 of column 806).
b. Find the first occurrence of lowest matching Object ID in the matching iterators (entry 898 of column 806). In this case, the object associated with the Object ID 9 has a match for the search value "dog" found in Field2 (as represented by highlighted entry 900 of column 808*b*).
c. Check that this value is the first non-null value in the chain (entry 902 of column 806). To do this, set the Value iterators to find a match at Object ID 9 (the Object ID in which the value of Field2 matched the search value "dog"). Here, the only Value iterator for the higher priority field Field1 returns a maximum integer value (in this example 2.15E+09) indicating there are no more matches for that Value iterator. Thus, the match in Field2 is the first non-null value in the chain.

d. Return that Object 9 is a match or add Object 9 to a list of matching objects to be returned (entry 902 of column 806).

Step 7: Continue on to find the next Match:

a. Advance Match Iterators that are equal to the previous match of Object ID 9 (entry 904 of column 806).

b. All match iterators return the maximum integer value (in this example 2.15E+09) indicating there are no more matches for those iterators. Thus, there are no more matches for the search.

So, for this example as depicted in FIG. 8, matches were correctly found at Objects 1, 5, 6, 7, 8, 9.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A search system, comprising:
    a processor;
    a data store, having a corpus and an index of the corpus stored thereon, the corpus comprising a set of objects, each object associated with a corresponding identifier; and
    a non-transitory computer readable medium, having instructions executable on the processor for:
        receiving a search query having a region chain operator, the region chain operator including a prioritized set of regions and a search value;
        generating a search tree for the region chain operator, the search tree having a region chain node including a region chain process configured according to the prioritized set of regions and the search value, wherein the region chain node has, for each region of the prioritized set of regions, a sub-node comprising a match process corresponding to the region and value and a value process corresponding to that region, wherein each of the match processes is a match iterator configured to evaluate the objects of the corpus according to an order of the objects and the result identifies a next object containing the search value in the region corresponding to the match process;

executing the search tree using the index to determine one or more objects of the corpus that satisfy the region chain operator, wherein executing the search tree comprises receiving a result from each of the match processes at the region chain process and evaluating the result from each of the match processes by the region chain process to determine if an object has a matching value for the search value in a first region of the prioritized set of regions and if the first region is a highest priority region of the prioritized set of regions that includes a value for that object, wherein evaluating the result from each of the match processes by the region chain process comprises determining the set of match iterators that returned a lowest object identifier, determining the highest priority region associated with the set of match iterators that returned the lowest object identifier and determining, for the object associated with the lowest object identifier, if the highest priority region for the set of match iterators that returned the lowest object identifier is the highest priority region of all the prioritized set of regions that includes any value for the object; and returning the identifiers for the one or more objects of the corpus that satisfy the region chain operator.

2. The search system of claim 1, wherein the order of the identifiers is sequential.

3. The search system of claim 2, wherein the region chain process is configured to call each of the match processes to determine the result for that match process.

4. The search system of claim 1, wherein each of the value processes is a value iterator configured to be initialized with an object identifier and evaluate the objects of the corpus according to a corresponding region and a second result from the value iterator is the identifier of the next object containing any value in the region corresponding to the value process.

5. The search system of claim 4, wherein determining, for the object associated with the lowest object identifier, if the highest priority region for the set of match iterators that returned the lowest object identifier is the highest priority region of all the prioritized set of regions that includes any value for the object comprises initializing each of the value iterators with the lowest object identifier, calling each of the value iterators, receiving the second result from each of the value processes at the region chain process and evaluating the result from each of the value processes by the region chain process to determine, for any value process that returns the second result equal to the lowest object identifier, if the region corresponding to that value process is of a higher priority than the first region.

6. The search system of claim 1, wherein the prioritized set of regions are statically defined and the regions chain operator include an identifier of a static definition of the prioritized set of regions and the search value.

7. The search system of claim 1, wherein in at least one of the prioritized set of regions includes a string value.

8. A non-transitory computer readable medium, comprising instructions for:

storing a corpus and an index of the corpus in a data store, the corpus comprising a set of objects, each object associated with a corresponding identifier;

receiving a search query having a region chain operator, the region chain operator including a prioritized set of regions and a search value;

generating a search tree for the region chain operator, the search tree having a region chain node including a region chain process configured according to the prioritized set of regions and the search value, wherein the region chain node has, for each region of the prioritized set of regions, a sub-node comprising a match process corresponding to the region and value and a value process corresponding to that region, wherein each of the match processes is a match iterator configured to evaluate the objects of the corpus according to an order of the objects and the result identifies a next object containing the search value in the region corresponding to the match process;

executing the search tree using the index to determine one or more objects of the corpus that satisfy the region chain operator, wherein executing the search tree comprises receiving a result from each of the match processes at the region chain process and evaluating the result from each of the match processes by the region chain process to determine if an object has a matching value for the search value in a first region of the prioritized set of regions and if the first region is a highest priority region of the prioritized set of regions that includes a value for that object, wherein evaluating the result from each of the match processes by the region chain process comprises determining the set of match iterators that returned a lowest object identifier, determining the highest priority region associated with the set of match iterators that returned the lowest object identifier and determining, for the object associated with the lowest object identifier, if the highest priority region for the set of match iterators that returned the lowest object identifier is the highest priority region of all the prioritized set of regions that includes any value for the object; and returning the identifiers for the one or more objects of the corpus that satisfy the region chain operator.

9. The computer readable medium of claim 8, wherein the order of the identifiers is sequential.

10. The computer readable medium of claim 9, wherein the region chain process is configured to call each of the match processes to determine the result for that match process.

11. The computer readable medium of claim 8, wherein each of the value processes is a value iterator configured to be initialized with an object identifier and evaluate the objects of the corpus according to a corresponding region and a second result from the value iterator is the identifier of the next object containing any value in the region corresponding to the value process.

12. The computer readable medium of claim 11, wherein determining, for the object associated with the lowest object identifier, if the highest priority region for the set of match iterators that returned the lowest object identifier is the highest priority region of all the prioritized set of regions that includes any value for the object comprises initializing each of the value iterators with the lowest object identifier, calling each of the value iterators, receiving the second result from each of the value processes at the region chain process and evaluating the result from each of the value processes by the region chain process to determine, for any value process that returns the second result equal to the lowest object identifier, if the region corresponding to that value process is of a higher priority than the first region.

13. The computer readable medium of claim 8, wherein the prioritized set of regions are statically defined and the regions chain operator include an identifier of a static definition of the prioritized set of regions and the search value.

14. The computer readable medium of claim 8, wherein in at least one of the prioritized set of regions includes a string value.

15. A method, comprising:
- storing a corpus and an index of the corpus in a data store, the corpus comprising a set of objects, each object associated with a corresponding identifier;
- receiving a search query having a region chain operator, the region chain operator including a prioritized set of regions and a search value;
- generating a search tree for the region chain operator, the search tree having a region chain node including a region chain process configured according to the prioritized set of regions and the search value, wherein the region chain node has, for each region of the prioritized set of regions, a sub-node comprising a match process corresponding to the region and value and a value process corresponding to that region, wherein each of the match processes is a match iterator configured to evaluate the objects of the corpus according to an order of the objects and the result identifies a next object containing the search value in the region corresponding to the match process;
- executing the search tree using the index to determine one or more objects of the corpus that satisfy the region chain operator, wherein executing the search tree comprises receiving a result from each of the match processes at the region chain process and evaluating the result from each of the match processes by the region chain process to determine if an object has a matching value for the search value in a first region of the prioritized set of regions and if the first region is a highest priority region of the prioritized set of regions that includes a value for that object, wherein evaluating the result from each of the match processes by the region chain process comprises determining the set of match iterators that returned a lowest object identifier, determining the highest priority region associated with the set of match iterators that returned the lowest object identifier and determining, for the object associated with the lowest object identifier, if the highest priority region for the set of match iterators that returned the lowest object identifier is the highest priority region of all the prioritized set of regions that includes any value for the object; and
- returning the identifiers for the one or more objects of the corpus that satisfy the region chain operator.

16. The method of claim 15, wherein the order of the identifiers is sequential.

17. The method of claim 16, wherein the region chain process is configured to call each of the match processes to determine the result for that match process.

18. The method of claim 15, wherein each of the value processes is a value iterator configured to be initialized with an object identifier and evaluate the objects of the corpus according to a corresponding region and a second result from the value iterator is the identifier of the next object containing any value in the region corresponding to the value process.

19. The method of claim 18, wherein determining, for the object associated with the lowest object identifier, if the highest priority region for the set of match iterators that returned the lowest object identifier is the highest priority region of all the prioritized set of regions that includes any value for the object comprises initializing each of the value iterators with the lowest object identifier, calling each of the value iterators, receiving the second result from each of the value processes at the region chain process and evaluating the result from each of the value processes by the region chain process to determine, for any value process that returns the second result equal to the lowest object identifier, if the region corresponding to that value process is of a higher priority than the first region.

20. The method of claim 15, wherein the prioritized set of regions are statically defined and the regions chain operator include an identifier of a static definition of the prioritized set of regions and the search value.

21. The method of claim 15, wherein in at least one of the prioritized set of regions includes a string value.

* * * * *